(12) United States Patent
Schwenk

(10) Patent No.: US 8,591,220 B2
(45) Date of Patent: Nov. 26, 2013

(54) VALVE PIN AND ACTUATOR ASSEMBLY FOR INJECTION MOLDING

(75) Inventor: Terry L. Schwenk, Kenosha, WI (US)

(73) Assignee: Terry L. Schwenk, Kenosha, WI (US)

( * ) Notice: Subject to any disclaimer, the term of this patent is extended or adjusted under 35 U.S.C. 154(b) by 27 days.

(21) Appl. No.: 13/371,454

(22) Filed: Feb. 12, 2012

(65) Prior Publication Data

US 2012/0225160 A1 Sep. 6, 2012

Related U.S. Application Data

(60) Provisional application No. 61/449,242, filed on Mar. 4, 2011.

(51) Int. Cl.
*B29C 45/23* (2006.01)

(52) U.S. Cl.
USPC .......................................... 425/564; 425/566

(58) Field of Classification Search
USPC ........................ 425/562, 563, 564, 565, 566
See application file for complete search history.

(56) References Cited

U.S. PATENT DOCUMENTS

| 4,468,191 A * | 8/1984 | Gellert ........................... 425/564 |
| 5,334,008 A * | 8/1994 | Gellert ........................... 425/549 |
| 2008/0258342 A1* | 10/2008 | Jenko ........................... 264/328.9 |
| 2010/0124579 A1* | 5/2010 | Tabassi et al. ........................... 425/3 |
| 2011/0018172 A1* | 1/2011 | Bouti et al. ............... 264/328.15 |
| 2011/0241238 A1* | 10/2011 | Trakas ............................ 264/39 |
| 2012/0231111 A1* | 9/2012 | Catoen ........................... 425/562 |

* cited by examiner

*Primary Examiner* — Tim Heitbrink

(57) ABSTRACT

A actuator assembly for a runnerless injection molding system. The actuator assembly is disposed in injection mold top clamp plate and incorporates a hollow actuator shaft whereby the valve pin passes trough the hollow actuator shaft and is firmly attached to the hollow actuator shaft providing easy access to the valve pin for maintenance. The top clamp plate incorporates openings providing access to actuator assembly. Actuator assembly incorporates a mechanism for attaching valve pin to hollow actuator shaft. The hollow actuator shaft can be activated, hydraulically, pneumatically or electrically in a linear movement providing a gate shut off valve.

14 Claims, 5 Drawing Sheets

VALVE PIN AND ACTUATOR ASSEMBLY FOR INJECTION MOLDING

RELATED APPLICATIONS

The present application is a continuation application of U.S. provisional patent application Ser. No. 61/449,242, filed Mar. 4, 2011, for METHOD FOR EASY ACCESS TO VALVE PIN AND ACTUATOR ASSEMBLY FOR INJECTION MOLDING, by Terry Schwenk, Paul Siodlarz, David Braden, Robert Luce, included by reference herein and for which benefit of the priority date is hereby claimed.

FIELD OF THE INVENTION

The present invention relates generally to an injection molding apparatus and in particular to the actuation of valve gated runnerless systems and how attachment of pin mechanisms which are disposed in a melt flow channel in an injection molding apparatus in a simplified manner giving easy access to valve pin mechanism.

BACKGROUND OF THE INVENTION

The present invention relates to the area of injection molding and in particular to valve pin actuators for runnerless injection molding systems, often referred to as hot runner systems. In runnerless valve gated systems for use in plastic injection molding industry, actuators are used to provide linear movement of the valve pins. The actuators pull the valve pin open prior to the start of injection allowing the plastic to flow from the injection molding machine through the runnerless system into the mold cavity. At the completion of the filling process the actuator closes valve pin preventing drooling of material when injection mold opens and plastic part is removed from the injection mold.

The actuator can be controlled hydraulically, pneumatically or electrically.

The valve pin is considered a wear item as well as the seals contained in the actuator assembly and the actuator assembly itself. These items periodically require maintenance or replacement. The valve pin contained in the actuator assembly are located typically within the top clamp plate of the injection mold runnerless system. Access to the valve pin usually requires some type of disassembly of the injection mold to gain access to actuator assembly where the valve pin is housed or attached. Access to the valve pin, typically housed within the actuator assembly, can be time consuming and difficult, requiring substantial disassembly of the injection mold gain access to the actuator assembly and the valve pin contained in the actuator assembly. In the case of hydraulic actuators, the disassembly process can be messy with hydraulic fluid leaking during disassembly. Current designs don't allow for removal of actuator assembly independent of the valve pin. In conjunction present designs don't allow removal of valve pin independent of the actuator assembly.

Ease of access to the valve pin and actuator assembly as in current designs is difficult and problematic. Because of the current designs constraints, access to the valve pin and assembly in some cases requires heating the runnerless system in order to remove the valve pin and actuator assembly in order to get to the internal components of the runnerless system. The valve pin is disposed within the runnerless system and is typically surrounded by plastics material. If operator makes a mistake and leaves mechanism un-attended for extended periods of time the plastic resin can degrade, clinging to the valve pin making it extremely difficult to remove. Having the valve pin housed in the actuator assembly, makes it near impossible to access the pin without destroying components.

This invention relates in general to improvements to valve gate actuators used in injection moldings systems. Although not limited to any particular field of use, the way the valve pin is accessed in present invention is particular useful when incorporated in runnerless injection molding systems.

For example U.S. Pat. No. 2007/0286923 to Jenko describes a unified monolithic piston and valve stem structure with reference to several other patents. This patent addresses reducing the number of parts in the actuator assembly, but doesn't allow easy access to the valve pin. If for instance, you wanted to remove one valve pin, you would need to remove the entire plate that houses all the valve pins in order to get to one pin. Another example U.S. Pat. No. 5,635,227 to Whisenhunt describes replaceable air cylinder unit and valve gate for injection molding machines. In this patent the valve gate actuator is disposed into top mold clamp plate and provides for access to the actuator assembly. Although this solution allows for access to individual actuators, it doesn't allow for independent removal of actuator and valve pin.

No other actuator assembly solution adequately address of ease of access to valve pin or actuator assembly.

It is therefore an object of the invention is to provide easy access to the valve pin contained in actuator assemblies on runnerless injection molding systems.

It is another object of the invention to provide easy access to hollow actuator shaft contained in actuator assembly on runnerless injection molding systems.

It is another object of the invention to provide a valve pin with removable head or clip It is another object of the invention to provide an improved design for mounting the actuator assembly to the injection mold plate.

It is another object of the invention to provide easy access to valve pin mechanism by providing holes in back plate It is another object of the invention to provide a means to detached valve pin from actuator assembly without disassembling actuator assembly or injection mold.

SUMMARY OF THE INVENTION

In accordance with the present invention, there is provided a actuator assembly. The actuator assembly provides a linear movement of a hollow actuator shaft which can be cylindrical in shape. The movement of hollow actuator shaft can be accomplished hydraulically, pneumatically, electrically. The actuator assembly is disposed in a injection mold in such a fashion to allow access to the hollow actuator shaft without disassembly of injection mold. Hollow actuator shaft allows for a valve pin, being rod in shape. to pass through the center of hollow actuator shaft. The valve pin is affixed to the hollow actuator shaft by use of a clip type mechanism and secured in place with a retainer which can be threaded on to hollow actuator shaft in such a fashion as to provide easy access to valve pin.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
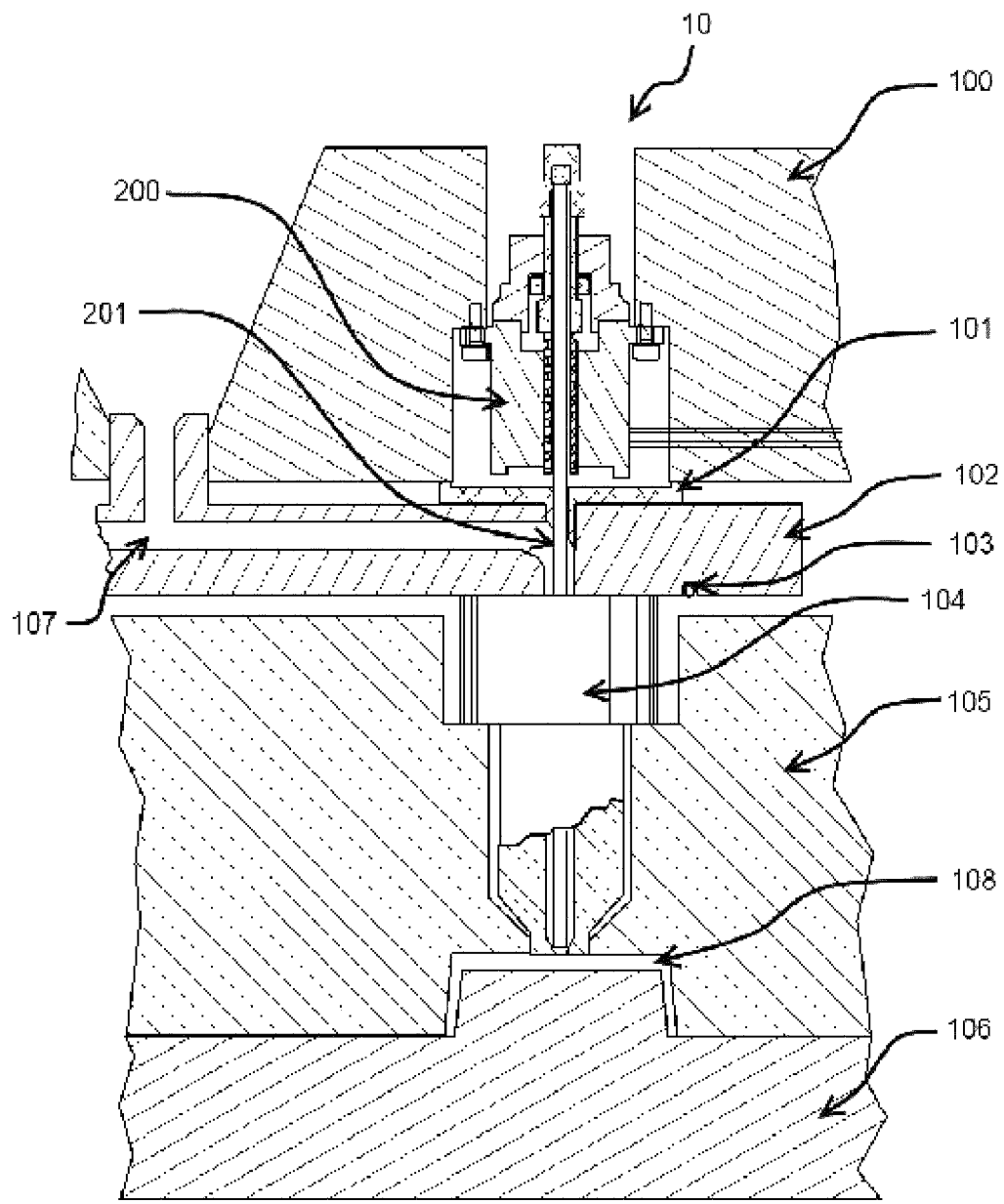
FIG. 1 is a partial view of a view of an injection mold with valve gated runnerless system using a electric motor linear actuator.

FIG. 1 shows an injection molding system 10 according to an embodiment of the invention. In the description of this embodiment, like reference numerals in the 100 series are used to describe like parts for ease of understanding. The features and aspects described for the other embodiments can be used accordingly with the present embodiment. The injection molding system 10 includes a back plate 100 and mold plate 105, mold core plate 106. A mold cavity 108, in which a molded product is formed from solidified molding material (melt), is defined between the mold plate 105, mold core plate 106. The mold core plate 106 typically retracts to eject the molded part from the mold cavity 108. A runnerless manifold 102 is disposed between the back plate 100 and the mold plate 105. The runnerless manifold 102 has a runnerless system melt channel 107 and a heater element 103, such as an electrical resistance heater in the form of an insulated heater wire. A runnerless nozzle 104 is connected to the runnerless manifold 102 and extends into a well formed in the mold plate 105. A runnerless system melt channel 107 runs through the runnerless nozzle 104, communicating the runnerless manifold 102 runnerless system melt channel 107 to the mold cavity 108. The combination of heated runnerless manifold 102 and runnerless nozzle 104 is known a runnerless injection system. It is common for runnerless injection systems to have more than one runnerless nozzle 104 to feed molding material to one or more mold cavities. A valve pin 201 extends from the back plate 100 to the mold cavity 108 through a valve pin bushing 101 connected to the runnerless manifold 102. The top of the valve pin 201 is connected to an electric actuator assembly 200 located in the back plate 100. The electric actuator assembly 200 moves the valve pin 201 up and down to control flow of molding material from the nozzle to the mold cavity 108. In FIG. 1, the valve pin 201 is shown to open and close a mold gate; however, the valve pin 201 can also be designed to control any other part of the flow path of molding material.

Figure 2:
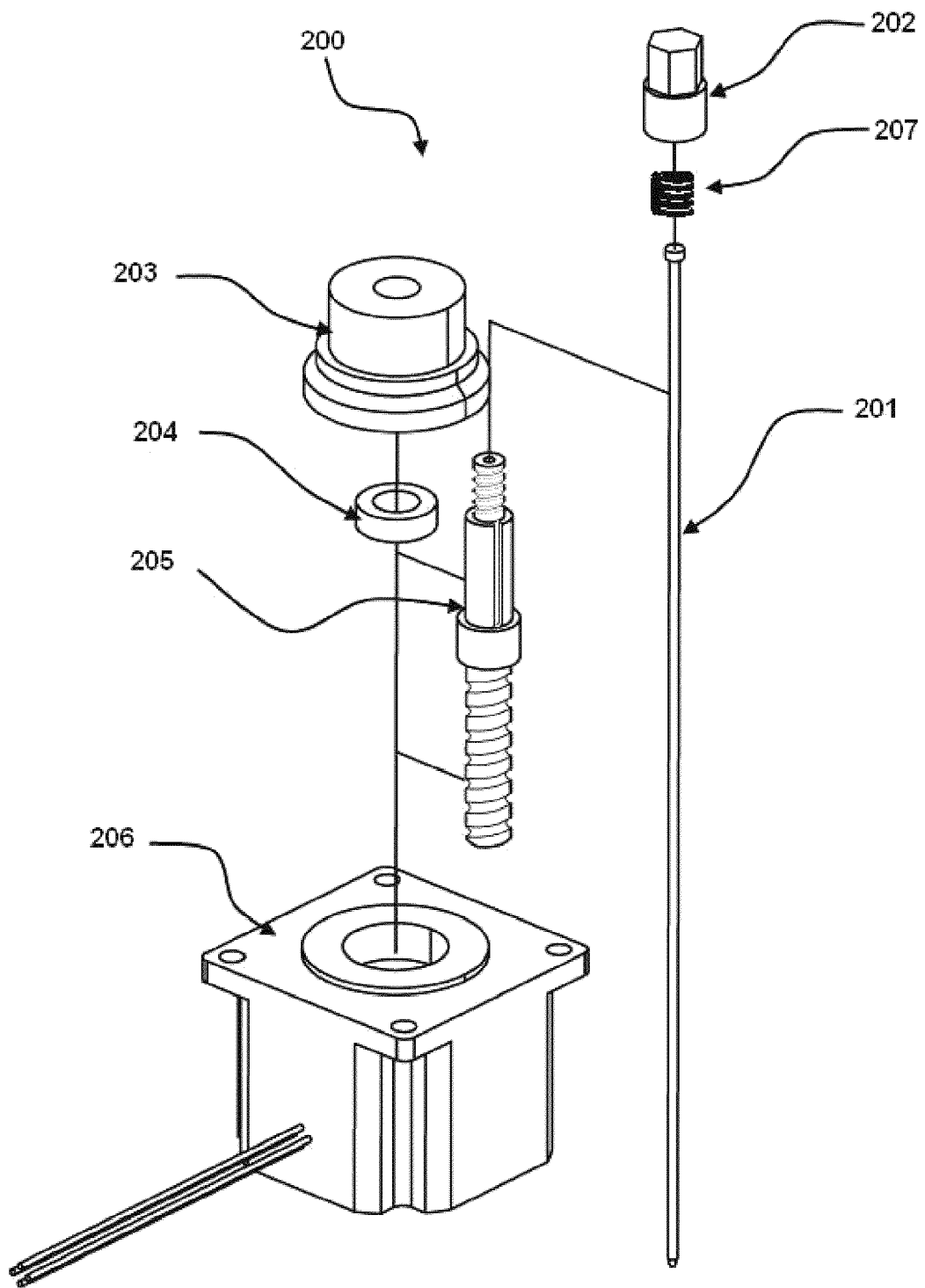
FIG. 2 is an exploded view of a valve pin electric actuator assembly.

FIG. 2 shows an embodiment of an electric actuator assembly 200. The electric actuator assembly 200 has an electric motor housing 206 with an anti-rotation bushing 203 rigidly affixed to the electric motor housing 206. Contained in the anti-rotation bushing 203 is a stroke limiter 204. The stroke limiter 204 can be made of different thickness restricting the linear movement of the hollow actuator shaft 205. The electric motor housing 206 incorporates a hollow actuator shaft 205 having a portion of the hollow actuator shaft 205 extending pasftt the electric motor housing 206 providing an area of the hollow actuator shaft 205 for attachment of the valve pin 201, with part of outer portion of hollow actuator shaft 205 being threaded in which the valve pin 201 passes through and is attached to hollow actuator shaft 205 with valve pin retainer 202. The electric motor housing 206 rotates around the threaded hollow actuator shaft 205 which is prevented from rotating by anti-rotation bushing 203 resulting in linear movement of hollow actuator shaft 205 causing opening and closing of the valve pin 201. Damper spring 207 is disposed into valve pin retainer 202 and is positioned between valve pin 201 and valve pin retainer 202 to provide a dampening preventing damage to valve pin 201.

Figure 3:
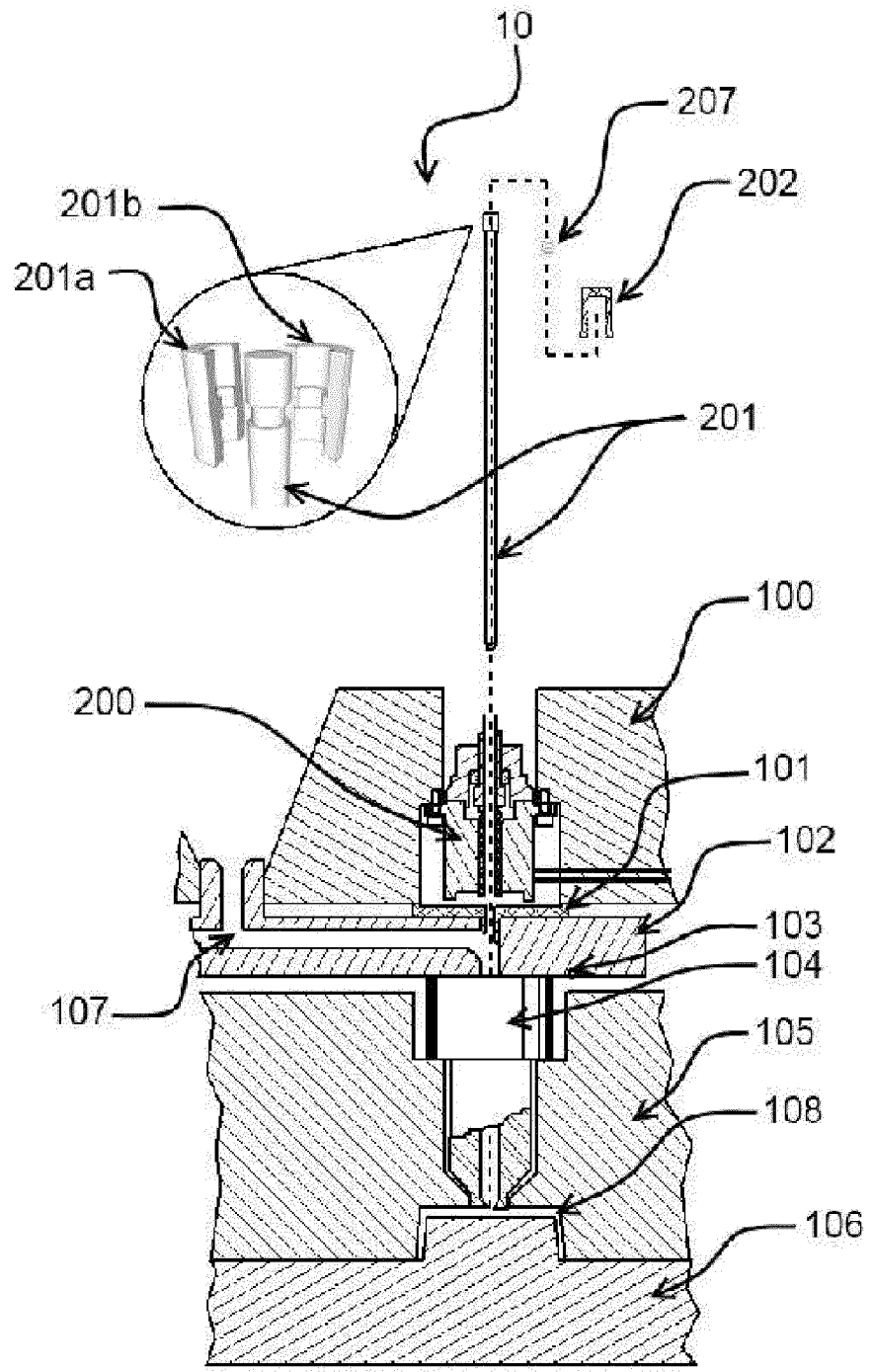
FIG. 3 is a partial view of an injection mold with runnerless system showing one method of removing valve pin.

FIG. 3 shows an embodiment of an injection molding system 10 with runnerless system showing one method of removing valve pin 201. The valve pin 201 is made of three components, a valve pin 201 with a groove placed at one end of the valve pin 201, a valve pin retainer clip "a" 201a and a valve pin retainer clip "b" 201b. The valve pin retainer 202 clips are placed in the groove around the diameter of the valve pin 201 and capacitively assembled to the valve pin 201. The valve pin retainer 202 clips are held in place when the valve pin retainer 202 is placed over the clips and screwed to the electric hollow actuator shaft 205.

Figure 4:
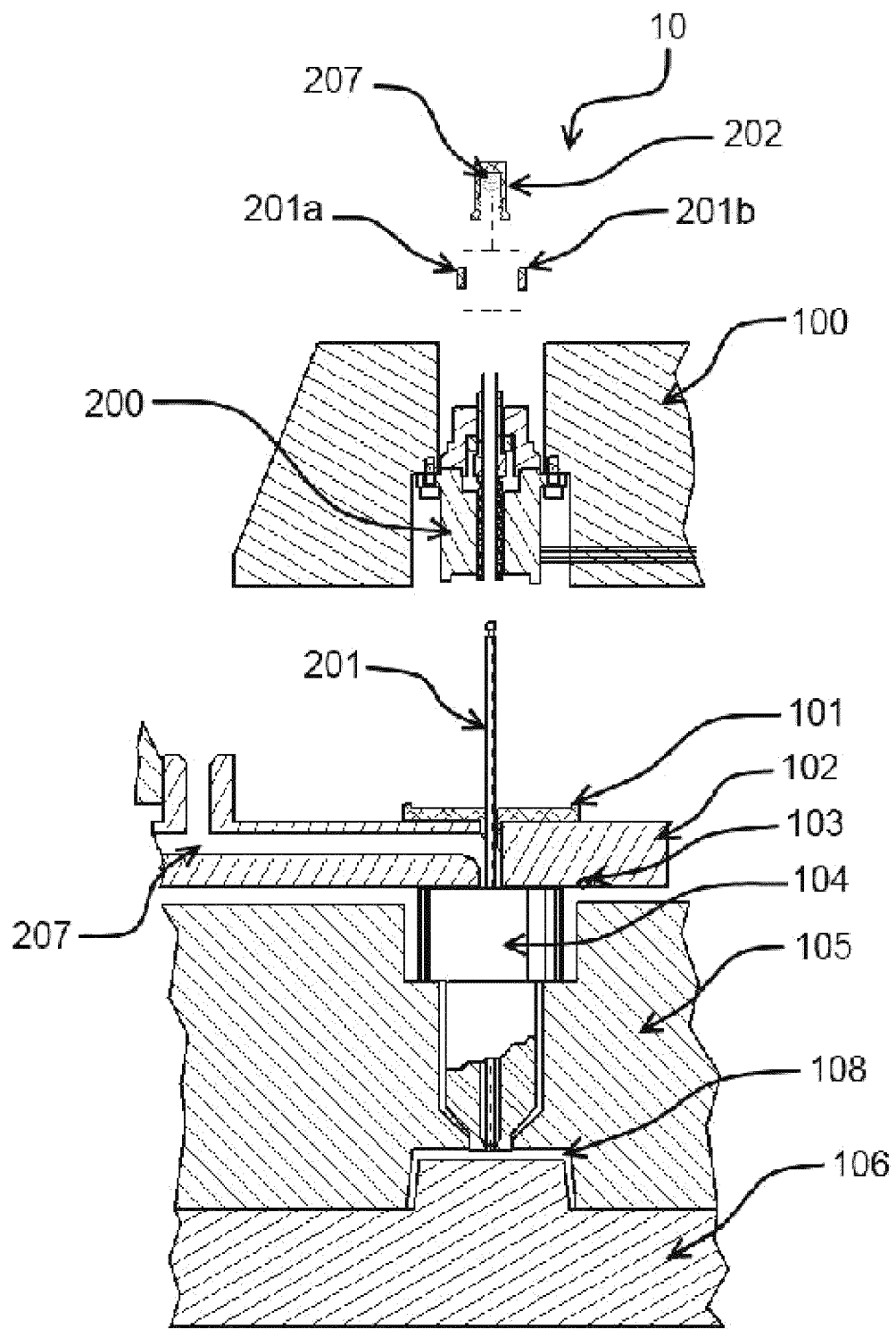
FIG. 4 is an exploded view of an one method for removing electric actuator assembly without removing said valve pin.

FIG. 4 shows an embodiment of an injection molding system 10 with runnerless system showing one method of removing electric actuator assembly 200 without removing the valve pin 201. Removing electric actuator assembly 200 can be accomplished by first unscrewing the valve pin retainer 202 and removing valve pin retainer clip "a" 201a and valve pin retainer clip "b" 201b. Back plate 100 which contains electric actuator assembly 200 can be removed allowing valve to pass freely through hollow actuator shaft 205.

Figure 5:
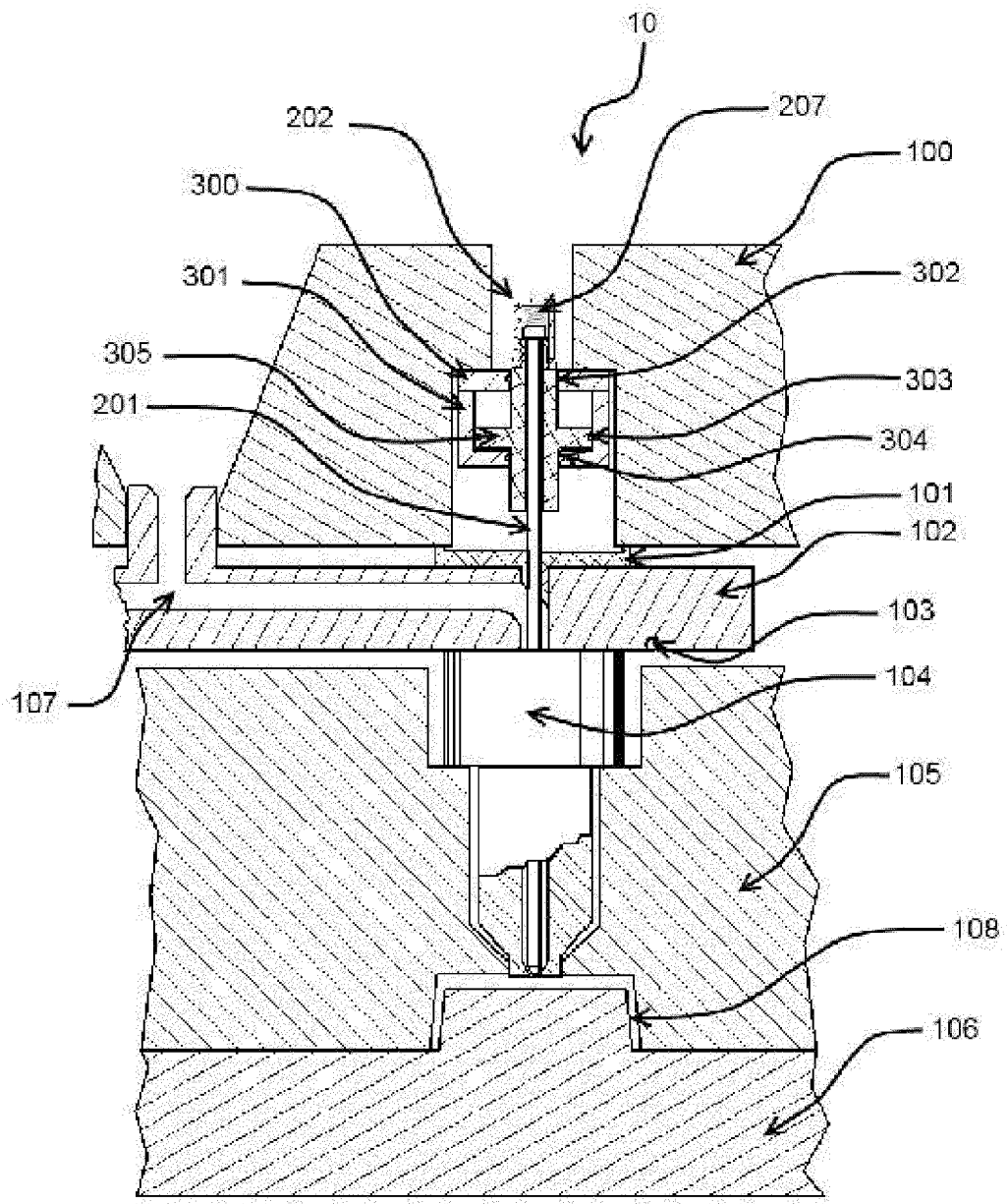
FIG. 5 is a partial view of an injection mold with valve gated runnerless system using an hydraulic linear actuator.

FIG. 5 shows an embodiment of an injection molding system 10 with runnerless system showing a hydraulic actuator assembly 300 with a hydraulic hollow actuator shaft 305 incorporating piston and hollow actuator shaft 205 where some portion of the hollow actuator shaft 205 extends pass hydraulic cylinder 301 at each end of the hydraulic cylinder 301. The hydraulic hollow actuator shaft 305 is disposed into hydraulic cylinder 301. hydraulic hollow actuator shaft 305 contains hydraulic hollow actuator shaft seal 303. To prevent oil from leaking out of the hydraulic cylinder 301 there are two seals hydraulic cylinder seal 302 and hydraulic cylinder bottom seal 304 positioned at each end of the hydraulic hollow actuator shaft 305.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A valve pin and actuator assembly for injection molding for providing easy access to a valve pin and actuator assembly used in runnerless injection molding valved gated systems, comprising:

means for providing a mounting frame for said valve pin actuator assembly and support for an injection mold;

means for shutting off a valve gate;

means for providing linear movement of said valve pin;

means for attaching said valve pin to a hollow actuator shaft;

means for preventing damage to said valve pin, insertably connected to said means for attaching said valve pin to hollow actuator shaft;

means for limiting linear travel of said valve pin actuator shaft;

means for serving as a holder for said valve pin and providing linear movement of said valve pin, rigidly affixed to said means for attaching said valve pin to said hollow actuator shaft, and insertably positioned to said means for shutting off valve gate;

means for rotating around said actuator shaft and transferring a rotating motion into a linear motion, turnably inserted to said means for serving as holder for said valve pin and providing linear movement for said valve pin, and securely mounted to said means for providing a mounting frame for said valve pin actuator assembly and support for an injection mold;

means for securing said valve pin into said valve pin retainer, capacitively assembled to said means for shutting off valve gate; and means for securing said valve pin into said valve pin retainer, capacitively assembled to said means for shutting off valve gate.

2. The valve pin and actuator assembly for injection molding in accordance with claim 1, wherein said means for providing a mounting frame for said valve pin actuator assembly and support for injection mold comprises a substantially flat, pocketed back plate.

3. The valve pin and actuator assembly for injection molding in accordance with claim 1, wherein said means for shutting off valve gate comprises a headless, round said valve pin.

4. The valve pin and actuator assembly for injection molding in accordance with claim 1, wherein said means for providing linear movement of said valve pin comprises an electric actuator assembly.

5. The valve pin and actuator assembly for injection molding in accordance with claim 1, wherein said means for attaching said valve pin to hollow actuator shaft comprises a valve pin retainer.

6. The valve pin and actuator assembly for injection molding in accordance with claim 1, wherein said means for preventing damage to said valve pin comprises a damper spring.

7. The valve pin and actuator assembly for injection molding in accordance with claim 1, wherein said means for limiting linear travel of said valve pin actuator shaft comprises a stroke limiter.

8. The valve pin and actuator assembly for injection molding in accordance with claim 1, wherein said means for serving as holder for said valve pin and provides linear movement of said valve pin comprises a cylindrical hollow actuator shaft.

9. The valve pin and actuator assembly for injection molding in accordance with claim 1, wherein said means for rotating around actuator shaft transferring a rotating motion into a linear motion comprises an electric motor housing.

10. The valve pin and actuator assembly for injection molding in accordance with claim 1, wherein said means for securing said valve pin into valve pin retainer comprises a first valve pin retainer clip.

11. The valve pin and actuator assembly for injection molding in accordance with claim 10, wherein said means for securing valve pin into valve pin retainer comprises a second valve pin retainer clip.

12. A valve pin and actuator assembly for injection molding for providing easy access to a valve pin and actuator assembly used in runnerless injection molding valved gated systems, comprising:

a substantially flat, pocketed back plate, for providing a mounting frame for valve pin actuator assembly and support for injection mold;

a headless, round valve pin, for shutting off a valve gate;

an electric actuator assembly, for providing linear movement of said valve pin;

a valve pin retainer, for attaching said valve pin to a hollow actuator shaft;

a damper spring, for preventing damage to said valve pin, insertably connected to said valve pin retainer;

a stroke limiter, for limiting linear travel of a valve pin actuator shaft;

a cylindrical hollow actuator shaft, for serving as a holder for said valve pin and providing linear movement of said valve pin, rigidly affixed to said valve pin retainer, and insertably positioned to said valve pin;

an electric motor housing, for rotating around actuator shaft transferring a rotating motion into a linear motion, turnably inserted to said hollow actuator shaft, and securely mounted to said back plate;

a first valve pin retainer clip, for securing valve pin into valve pin retainer, capacitively assembled to said valve pin; and a second valve pin retainer clip, for securing said valve pin into said valve pin retainer, capacitively assembled to said valve pin.

13. The valve pin and actuator assembly for injection molding as recited in claim 12, further comprising:

an anti-rotation bushing, for preventing said hollow actuator shaft from rotating, insertably affixed to said stroke limiter, and rigidly affixed to said electric motor housing.

14. A valve pin and actuator assembly for injection molding for providing easy access to said valve pin and actuator assembly used in runnerless injection molding valved gated systems, comprising:

a substantially flat, pocketed back plate, for providing a mounting frame for said valve pin actuator assembly and support for an injection mold;

said valve pin being a headless, round said valve pin, for shutting off valve gate;

an electric actuator assembly, for providing linear movement of said valve pin;

a valve pin retainer, for attaching said valve pin to a hollow actuator shaft;

a damper spring, for preventing damage to said valve pin, insertably connected to said valve pin retainer;

an anti-rotation bushing, for preventing said hollow actuator shaft from rotating;

a stroke limiter, for limiting linear travel of said actuator shaft, insertably affixed to said anti-rotation bushing;

a cylindrical hollow actuator shaft, for serving as holder for said valve pin and provides linear movement of said valve pin, rigidly affixed to said valve pin retainer, and insertably positioned to said valve pin;

an electric motor housing, for rotating around said actuator shaft transferring a rotating motion into a linear motion, turnably inserted to said hollow actuator shaft, rigidly affixed to said anti-rotation bushing, and securely mounted to said back plate;

a first valve pin retainer clip, for securing said valve pin into said valve pin retainer, capacitively assembled to said valve pin; and a second valve pin retainer clips, for securing said valve pin into said valve pin retainer, capacitively assembled to said valve pin.

* * * * *